Sept. 25, 1956 | P. C. GOLDMARK | 2,764,629

TELEVISION

Filed Dec. 17, 1952 | 2 Sheets-Sheet 1

INVENTOR
Peter C. Goldmark
BY
Pennie, Edmonds, Morton, Barrows and Taylor
ATTORNEYS INVENTOR
Peter C. Goldmark
BY
Pennie, Edmonds, Morton, Barrows and Taylor
ATTORNEYS United States Patent Office 2,764,629

Patented Sept. 25, 1956

2,764,629

TELEVISION

Peter C. Goldmark, New Canaan, Conn., assignor to Columbia Broadcasting System, Inc., New York, N. Y., a corporation of New York Application December 17, 1952, Serial No. 326,378

8 Claims. (Cl. 178—5.4)

This invention relates to television transmission, and particularly to a method of and apparatus for developing television video signals for transmission. The invention is especially directed to color television, but in its broader aspects is also applicable to black-and-white television.

Both direct pickup and film scanning are widely employed in television transmission at the present time. Direct pickup has the advantage that the events are transmitted simultaneously with their occurrence, but in many cases it is inconvenient to assemble the desired personnel at the time of transmission. Also, for remote pickup and for unexpected events, direct pickup requires moving a considerable amount of equipment to the remote location and making air time available at the time of pickup. Accordingly, program material is often recorded on motion picture film and subsequently transmitted at an appropriate time.

In color television using the three-color double-interlaced filed sequential system, such as disclosed in my Patent 2,480,571, issued August 30, 1949, successive field scansions correspond to different colors and also to alternate interlaces. The field scanning frequency is considerably higher than that employed in black-and-white television, and at the present time 144 fields per second has been adopted. In color television film scanning equipment heretofore proposed, using this system, unitary three-color film, such as those known under the trademarks "Kodachrome" and "Technicolor" have commonly been employed. Suitable equipment has been developed for transmitting such film but is often complicated and expensive. In equipment of the intermittent type, a very rapid pull down is required which necessitates special mechanisms which are relatively expensive and difficult to design and maintain.

It is a primary object of the present invention to provide a method and equipment which enables the employment of unitary color film in the photographic camera, and yet allows the use of intermittent film-feeding mechanisms for the television scanning which have a relatively long pull down period and hence may be the same, or substantially the same, as the mechanisms commonly employed in motion picture practice.

In accordance with one aspect of the invention, images of the desired subject matter are first photographically recorded on color sensitive motion picture film. The film is then utilized to produce three separate color-separation motion picture films, each representing a different primary color of the subject matter. The separate films may be in monochrome or in respective colors, as desired. It is preferred to employ film of the type in which three emulsion layers sensitive to different primary colors are carried on a single support and, after exposure, are stripped and processed so as to provide three separate color-separation motion picture films of like subject matter. The use of this type film has the advantage that a conventional motion picture camera may be employed and yet after processing three separate color-separation films are available. However, it is also possible to make color separation prints from a single multicolor film.

If desired, the color motion picture film may consist of three separate films, each sensitive to a different primary color, and used in a beam-splitting camera so that the images of the subject matter are initially recorded on three separate films. The three films may then be developed and color-separation prints obtained therefrom. This method is well known in motion picture practice and need not be described further.

In the specific embodiments of the invention described hereinafter, after the three color-separation films are prepared they are scanned by apparatus employing a single scanning device and three intermittent film-feeding devices. The scanning device has associated deflecting means for developing a double-interlaced scanning pattern of the type in which the two interlaces alternate at field frequency. The apparatus is designed so that the scanning device is operatively associated with each film-feeding device in succession so as to scan films therein successively during successive fields scansions in sequence. An intermittent pull down mechanism is provided in each film-feeding device and the driving means therefor are synchronized with the field scansions and arranged to pull down the films in succession. The pull down of each film is timed to occur after each two field scansions thereof during the interval the other two films are being scanned.

The use of a single scanning device eliminates problems of precise linearity and area control of the scanning pattern, which are inherent in the use of more than one scanning device. Furthermore, the use of three films in three separate intermittent film-feeding devices, with the previously mentioned standards allows each film to be advanced at the normal rate of twenty-four film frames per second, and one-third of the film frame period is available for pull down. Thus the requirements as to pull down are no more stringent than in conventional motion picture practice and pose no special problems.

Other features of the invention will be understood from the discussion hereinafter.

The invention will be more fully understood by reference to the following description of specific embodiments thereof taken in conjunction with the drawings in which.

Figure 1:
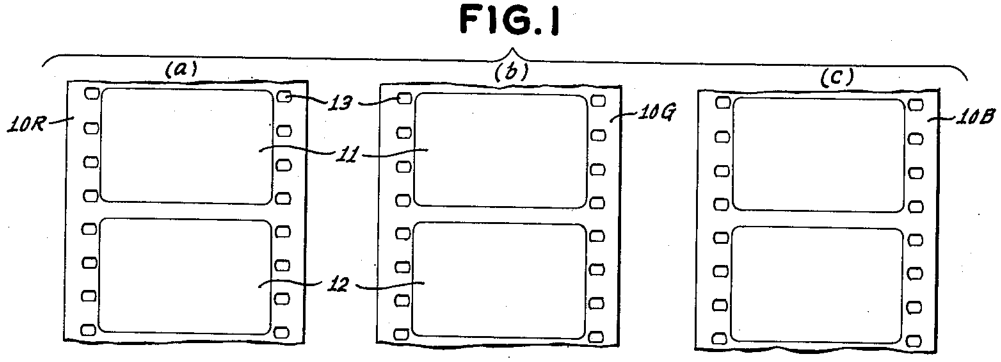
Fig. 1 illustrates fragments of the three color-separation films used in a specific embodiment of the invention.

Referring to Fig. 1, fragments of motion picture film are shown bearing color-separation images of like subject matter. Specifically, a red color-separation film is shown at (A), a green color-separation film at (B) and a blue color-separation film at (C). Two film-frame areas 11 and 12 are shown, representing successive views of the object field. The films have the customary sprocket holes 13. They may be positives or negatives, and may be either in monochrome or in color. The apparatus hereinafter described can be designed to accommodate the type of film desired to be used, as will be understood by those in the art.

Figure 2:
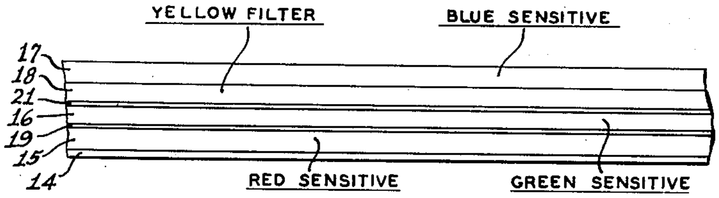
Fig. 2 is a cross-section of a fragment of film which can be stripped for processing.

Referring now to Fig. 2, a multi-layer color motion picture film of the stripping type is shown in cross-section. It comprises a support or substratum 14, and three color-sensitive emulsion layers 15, 16 and 17. These may be sensitive to red, green and blue light in the order named. With this order of emulsions, if the red and green layers are sensitive to blue light a yellow filter 18 may be employed to eliminate blue. To facilitate subsequent stripping of the several layers, interlayers 19 and 21 may be employed, these layers being readily soluble in water.

Figure 3:
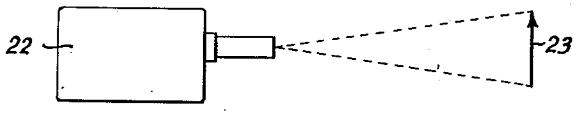
Fig. 3 is a sketch of a camera used in originally photographing the subject matter.

In use, the film of Fig. 2 is placed in a camera such as depicted at 22 in Fig. 3 and exposed to light from the object field 23. Thereafter layers 17 and 16 may be separately stripped, coated on suitable separate support films, and developed. The lowest emulsion layer 15 may be left attached to substratum 14 and developed. When the processing is completed, three films of the type shown in Fig. 1 are obtained.

The use of this type of film has the advantage that it can be employed in a camera 22 of the conventional motion picture type. Since the emulsion layers are superposed, all three color-separation negatives are photographically recorded from a single point of view with a single lens so as to avoid parallax. Furthermore, there is no need to employ beam-splitting arrangements which reduce the light efficiency and hence require wider aperture lenses or greater illumination. The film shown in Fig. 2, and the description of the processing involved, is described more in detail in the Journal of the Society of Motion Picture and Television Engineers, April 1950, pp. 445–453. Other types of multi-layer film may be employed and separate color-separation films produced therefrom by any desired process.

If desired, the color film employed in the original photographic recording of the subject matter may be of the separate film type, and camera 22 constructed to accommodate the three films and permit simultaneous exposure thereof. The three films may then be developed to obtain three color-separation films as depicted in Fig. 1.

Figure 4:
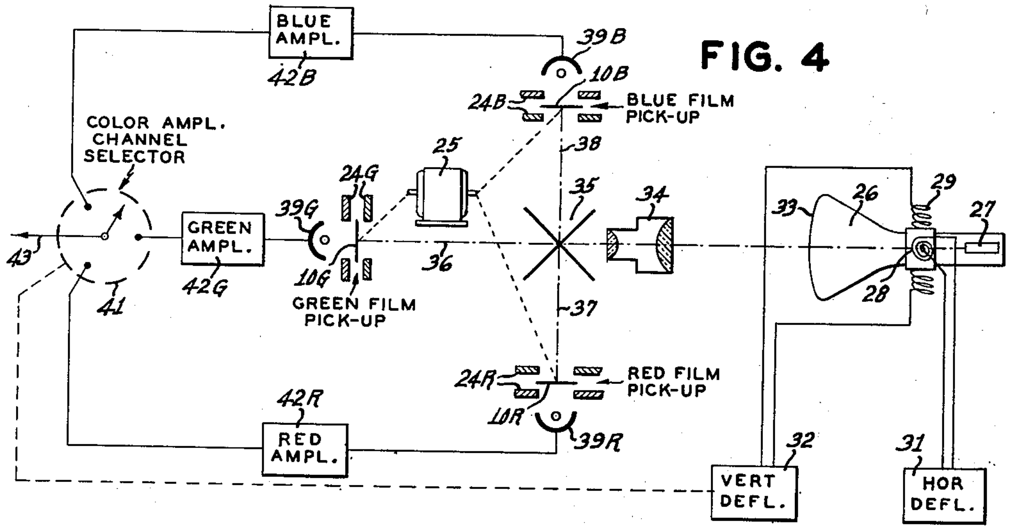
Fig. 4 shows one embodiment of pickup apparatus in accordance with the invention.

Referring now to Fig. 4, apparatus is shown employing the so-called "flying spot" type of scanning. Three color-separation films 10R, 10G and 10B, such as shown in Fig. 1, are threaded into separate film-feeding devices of the intermittent type. Intermittent film-feeding devices are widely employed in motion picture cameras and projectors, and hence are not illustrated except for the film gates, 24R, 24G and 24B. A motor 25 is coupled to each pull down mechanism so as to pull down the respective films intermittently. The phasing of the pull down will be discussed hereinafter.

A cathode-ray tube 26 is shown for developing a scanning pattern. The cathode ray beam is generated by a suitable gun 27 and deflected in horizontal and vertical directions by suitable means such as deflecting coils 28 and 29. The coils are energized by suitable horizontal and vertical sawtooth deflection wave generators 31, 32. This portion of the apparatus may follow conventional practice in flying spot scanners. The vertical and horizontal deflection wave generators are synchronized and their frequencies selected to yield a double-interlaced scanning pattern in which the odd lines are scanned in one field scansion and the even lines scanned in the next field scansion. Odd and even interlaces hence alternate at field frequency.

The scanning pattern on the face 33 of the cathode-ray tube is projected through lens 34 and a beam-splitting arrangement 35 to each of the films 10R, 10G, 10B. The beam-splitting arrangement 35 is here shown as a pair of half-silvered mirrors which permit light to pass therethrough along path 36, and also reflect light at right angles along paths 37 and 38. Such arrangements are well-known in the field of optics and need not be described in detail.

The projected scanning light beam passes through film frame areas of each film and is modulated thereby. The resultant light falls on respective photoelectric cells 39R, 39G and 39B to develop a video signal which varies in accordance with the density of the images on the respective films. Accordingly, the output of photoelectric cell 39R is a video signal representing the red aspect of the photographed subject matter as recorded on the red color-separation film 10R. This signal is fed to a switch device 41, and amplifier 42R may be employed if desired. Similarly the green video signal from 39G is fed to switch 41, through amplifier 42G if desired, and the same is true for the blue video signal from 39B. The photoelectric cells may include respective electron multipliers if desired.

Switch 41 is designed to switch the three-color outputs successively to the output line 43. The switch is synchronized with the field scansions so that red, green and blue video signals are supplied successively to the output circuit in sequence, each signal representing a field scansion and then alternating with the field scansions of the other colors. Switch 41 is shown only diagrammatically. It could take the form of a commutator, but in practice an electronic switch is more desirable. Suitable switches are known in the art and need not be described in detail. In order to obtain proper color balance, the relative amplitudes of the different color signals may be adjusted by changing the gain of the multipliers or amplifiers in the several channels.

Figure 5:
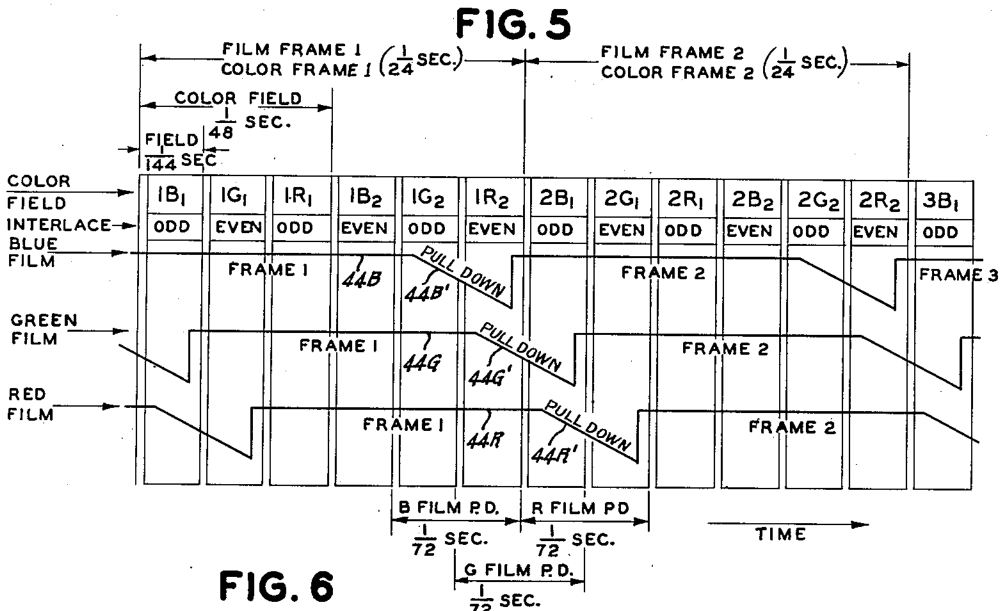
Fig. 5 shows the film scanning sequence and pull down relationships for the apparatus of Fig. 4.

Referring now to Fig. 5, the overall operation of the apparatus of Fig. 4 is shown in diagrammatic form. The vertical columns represent successive field scansions, and the top row of legends identifies the fields being scanned. The first numeral denotes the film frame being scanned, the letter denotes the color film being scanned, and the second numeral denotes the interlace being scanned. Thus, "1B1" indicates that the first film frame of the blue film is being scanned by the first (odd) interlace. The fourth column "1B2" indicates that the first film frame of the blue film is being scanned by the second (even) interlace for that color. The second row indicates odd and even interlaces, and it will be observed that the two columns just mentioned show that the first film frame of the blue film has been scanned by both odd and even interlaces. The same is true for the other columns, corresponding film frames of each color-separation film being scanned by both odd and even interlaces after six field scansions. This interval has been denoted "Film Frame 1" and also "Color Frame 1," since the first film frame of each of the color films has been scanned by both sets of lines. With the field scansions recurring at the rate of 144 per second, six field scansions take 1/24 second which corresponds to the conventional motion picture speed of 24 film frames per second. The color field is shown as the interval during which all three color films are scanned in one or the other interlaces.

The horizontal line 44B indicates the interval during which the blue film 10B is at rest, and it will be noted that it remains at rest while the first film frame is scanned by both interlaces. After the second field scansion of that film, the film is pulled down during the interval indicated by the slanting line 44B'. It will be noted that an interval of 1/72 second is available for the pull down since movement can commence immediately after the second scanning of the blue image and can last until the scanning of the next film frame in blue commences. In order to provide a slight factor of safety, the pull down is shown as completed in somewhat less than 1/72 second.

The operation of the green film-feeding device is shown by the next line in Fig. 5. Here the green film remains at rest during the interval represented by the horizontal line 44G, so that the first green film frame is scanned by both interlaces (even and odd) while it is at rest. The pull down depicted by line 44G' takes place after the second field scansion of the first green film frame, and is completed prior to the next field scansion of the green film (column "2G1"). Similar intermittent operation of the red film-feeding device is shown by lines 44R and 44R'.

It will be observed that the pull down of the three films takes place successively in regular sequence, and that the pull down of a given film is timed to occur after each two field scansions thereof during the interval the other two films are being scanned. Since an interval approximately one-third of the film feeding rate is allowed for pull down, conventional intermittent mechanisms can be employed for the purpose.

Referring back to Fig. 4, motor 25 is coupled to each intermittent film-feeding device so as to feed the respective films at the rate of 24 film frames per second. The pull downs of the three devices are phased so that they occur successively in the manner shown in Fig. 5. The motor is operated synchronously with the field scansions so that the desired frequency and phase relationships are preserved. This can conveniently be done by sychronizing both motor and scanning wave generators to the 60 cycle power line, or by any other means desired.

Figures 6, 7, 8:
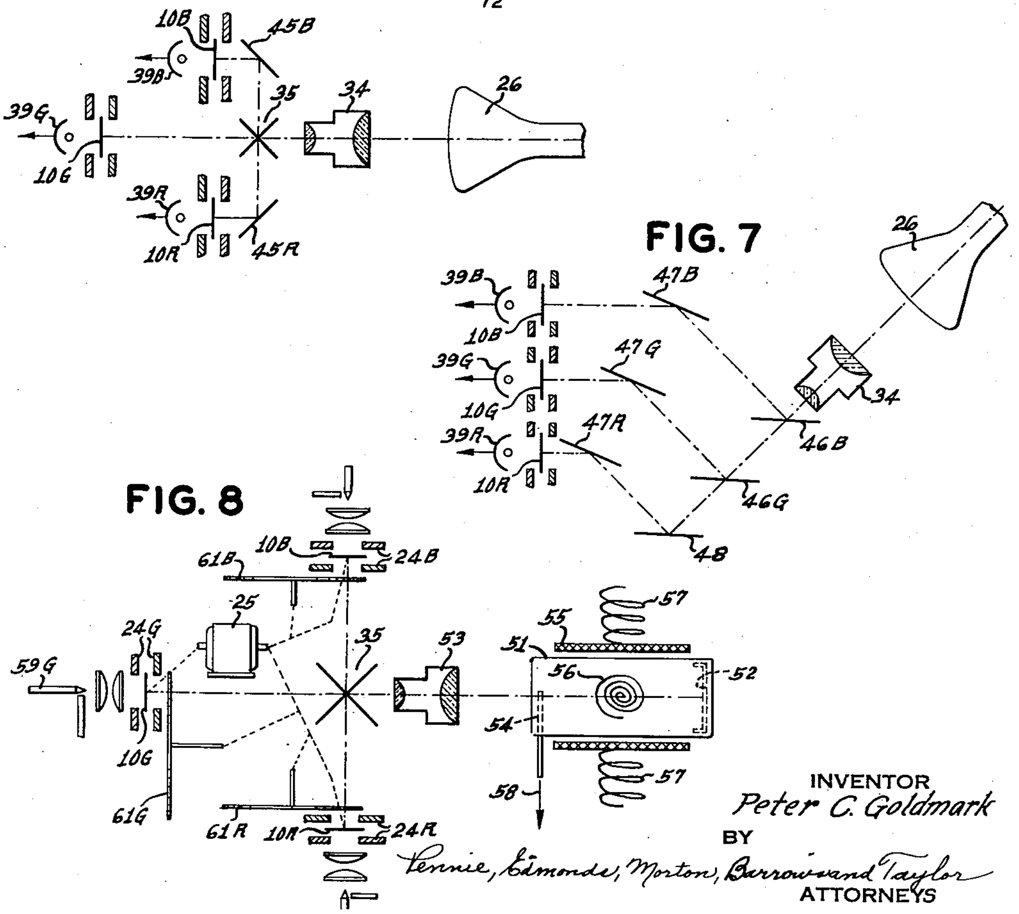
Figs. 6, 7 and 8 illustrate further embodiments of appatus of the invention.

Fig. 6 is a schematic showing an embodiment similar to that of Fig. 4, except that in this case the film-feeding devices are positioned so that films 10R and 10B lie in a plane parallel to that of 10G. Additional mirrors 45R and 45B are disposed in the path of light from the beam-splitter 35 to respective films to turn the beam of light through 90°.

Fig. 7 is another embodiment in which films 10R, 10G and 10B are all in the same plane. In this case, semi-transparent mirrors 46B and 46G are arranged in the path of the projected light scanning beam so as to divert a portion of the light to mirrors 47B and 47G, respectively. Mirror 48 is positioned to divert the remainder of the scanning light beam to mirror 47R. This arrangement permits the film-feeding devices to be arranged side by side, and facilitates the use of gearing for driving the devices in synchronism and proper phase. Preferably the mirrors are arranged so that the light paths from the scanning device 26 to respective films are of equal length.

The arrangements of Figs. 6 and 7 may be operated in the manner described in connection with Figs. 4 and 5.

Referring now to Fig. 8, instead of a flying spot scanner, a scanning device of the so-called "Image dissector" type is employed. This scanning device comprises an evacuated envelope 51 provided with a photosensitive target 52 on which light images are focused by projection lens 53. The emitted photoelectrons are accelerated toward the scanning finger 54, and the spacial distribution is maintained by focusing coil 55 so that an electron image is formed in the plane of finger 54 corresponding to the optical image projected on target 52. The electron image is deflected back and forth past the finger 54 by deflecting coils 56 and 57. Finger 54 has a small aperture corresponding in size to the desired scanning element, and the electrons entering the aperture are electron-multiplied to produce an output signal in line 58. The construction and operation of this type of device is well understood so that further detailed description is unnecessary.

The deflection coils are energized by vertical and horizontal sawtooth wave generators in the manner described in connection with Fig. 4. They are correlated to produce a double-interlaced scanning pattern as previously described.

In this embodiment light images of the three color-separation films are successively projected to the scanning device, rather than having the light scanning pattern projected toward the films as in the case of the previous embodiments. To this end, each film-feeding device is provided with a source of illumination here shown as arcs 59R, 59G and 59B. The light from each arc passes through a suitable condenser lens to the corresponding film 10R, 10G and 10B. The film frame images thus illuminated are projected by means of the crossed mirror arrangement 35 and projection lens 53 to the target 52 of the scanning device. If desired, the optical arrangements shown in Figs. 6 and 7 may be employed, or any other suitable optical system.

When the color-separation films are in color rather than in monochrome, dichroic mirrors may be employed in the beam splitters of any of the embodiments described, if desired.

In order to project the images successively to the scanning device shutters 61R, 61G, 61B are provided, all actuated by a common motor 25 which also actuates the intermittent pull down mechanisms. The shutters are designed so that the film-frame images on the three films are successively projected at field scanning frequency.

The overall operation of the embodiment of Fig. 8 is that shown in Fig. 5 and explained hereinbefore. The operation is similar to that of the apparatus of Fig. 4 except for the differences resulting from the use of the image dissector rather than the flying spot scanner.

In Fig. 4 the outputs of the individual photoelectric cells are successively switched at 41 so that the resulting signal in output line 43 is a sequential multi-color video signal. The apparatus of Fig. 8 employs optical switching produced by shutters 61R, 61G, 61B. If desired, shutters could be employed in the apparatus of Fig. 4 and the outputs of amplifiers 42R, 42G and 42B directly combined, the optical switching being employed in place of switch 41 to produce the sequential color video signal. If desired, of course, other switching means, mechanical, optical or electronic, may be employed in any of the embodiments to render the scanning device effective to scan the color-separation films in succession.

In the foregoing specific embodiments the scanning of color-separation films to produce color video signals has been described, since the invention is especially directed to color television. However, the apparatus may also be employed in black-and-white television by employing two films of corresponding subject matter. In either case, the number of films and number of film-feeding devices, the film-feeding rates, the pull down sequence, the switching sequence, and the scanning standards may be selected to suit the application. Also, certain features of the invention may be employed, omitting others, as will be clear to those skilled in the art.

I claim:

1. A television film-scanning system for scanning a plurality of motion picture films of corresponding subject matter to develop a video signal which comprises a plurality of intermittent film-feeding devices adapted to receive said motion picture films respectively, a scanning device and associated means for scanning film-frame areas of films in said film-feeding devices and producing video signals therefrom, said scanning device including line and field deflecting means for producing a two-dimensional scanning pattern, switching means synchronized with the field scansions for rendering the scanning device effective at said film-feeding devices alternately in sequence, and an intermittent pull-down mechanism in each of said film-feeding devices and driving means therefor designed and adapted to pull down the films in succession, the pull down of each film being timed to occur during the scansion of other of said films.

2. A television film-scanning system for scanning a plurality of motion picture films of corresponding subject matter to develop a video signal which comprises a plurality of intermittent film-feeding devices adapted to receive said motion picture films respectively, a scanning device and associated means for scanning film-frame areas of films in said film-feeding devices and producing video signals therefrom, said scanning device including deflecting means for developing a double-interlaced scanning pattern in which the interlace patterns alternate at field frequency, switching means synchronized with the field scansions for rendering the scanning device effective at said film-feeding devices alternately in sequence, and an intermittent pull-down mechanism in each of said film-feeding devices and driving means therefor designed and adapted to pull down the films in succession, the pull down of each film being timed to occur during the scansion of other of said films.

3. A television film-scanning system for scanning a plurality of motion picture films of corresponding subject matter to develop a video signal which comprises a plurality of intermittent film-feeding devices adapted to receive said motion picture films respectively, a scanning device and associated means for scanning film-frame areas of films in said film-feeding devices and producing video signals therefrom, said scanning device including deflecting means for developing a double-interlaced scanning pattern in which successive interlace patterns alternate at field frequency, switching means synchronized with the field scansions for rendering the scanning device effective at said film-feeding devices successively during successive field scansions in sequence, and an intermittent pull-down mechanism in each of said film-feeding devices and driving means therefor designed and adapted to pull down the films in succession, the pull down of each film being timed to occur after each two field scansions thereof during the scansion of other of said films.

4. A color television film-scanning system for scanning three primary color-separation motion picture films of like subject matter to develop a color video signal therefrom which comprises three intermittent film-feeding devices adapted to receive said color-separation films respectively, a scanning device and associated means for scanning film-frame areas of films in each of said film-feeding devices and producing color video signals therefrom, said scanning device including deflecting means for developing a double-interlaced scanning pattern in which two interlace patterns alternate at field frequency, switching means synchronized with the field scansions for rendering the scanning device effective to scan films, in said film-feeding devices successively during successive field scansions in regularly recurring sequence, and an intermittent pull-down mechanism in each of said film-feeding devices and driving means therefor synchronized with said field scansions and designed and adapted to pull down the films in succession, the pull down of each film being timed to occur after each two field scansions thereof during the interval the other two films are being scanned.

5. A color television film-scanning system for scanning three primary color-separation motion picture films of like subject matter to develop a color video signal therefrom which comprises three intermittent film-feeding devices adapted to receive said color-separation films respectively, a scanning device and associated means for scanning film-frame areas of films in each of said film-feeding devices and producing color video signals therefrom, said scanning device including deflecting means for developing a double-interlaced scanning pattern in which two interlace patterns alternate at field frequency, switching means for rendering said scanning device operable to scan films in said film-feeding devices in succession, said switching means being synchronized with the field scansions to shift the scansion from one film to the next after each field scansion in regularly recurring sequence, and an intermittent pull-down mechanism in each of said film-feeding devices and driving means therefor synchronized with said field scansions and designed and adapted to pull down the films in succession, the pull down of each film being timed to occur after each two field scansions thereof during the interval the other two films are being scanned.

6. A color television film-scanning system for scanning three primary color-separation motion picture films of like subject matter to develop a color video signal therefrom which comprises three intermittent film-feeding devices adapted to receive said color-separation films respectively, a scanning device of the flying spot type and deflecting means associated therewith for developing a luminous double-interlaced scanning pattern in which the interlace patterns alternate at field frequency, projection means for projecting said scanning pattern to said film-feeding devices to scan films therein, light-sensitive devices positioned in said film-feeding devices respectively to receive light from said scanning device as modulated by films therein and develop corresponding color video signals, a common output for said light-sensitive devices, switching means for rendering said scanning and light-sensitive devices operable to scan films in said film-feeding devices in succession, said switching means being synchronized with the field scansions to shift the scansion from one film to the next after each field scansion in regularly recurring sequence, and an intermittent pull-down mechanism in each of said film-feeding devices and driving means therefor synchronized with said field scansions and designed and adapted to pull down the films in succession, the pull down of each film being timed to occur after each two field scansions thereof during the interval the other two films are being scanned.

7. A color television film-scanning system for scanning three primary color-separation motion picture films of like subject matter to develop a color video signal therefrom which comprises three intermittent film-feeding devices adapted to receive said color-separation films respectively, a scanning device of the flying spot type and deflecting means associated therewith for developing a luminous double-interlaced scanning pattern in which the interlace patterns alternate at field frequency, projection means for projecting said scanning pattern to said film-feeding devices to scan films therein, light-sensitive devices positioned in said film-feeding devices respectively to receive light from said scanning device as modulated by films therein and develop corresponding color video signals, a common output for said light-sensitive devices, switching means synchronized with said field scansions and adapted to connect said light-sensitive devices to said common output successively for successive field scansions, and an intermittent pull-down mechanism in each of said film-feeding devices and driving means therefor synchronized with said field scansions and designed and adapted to pull down the films in succession, the pull down of each film being timed to occur after each two field scansions thereof during the interval the other two films are being scanned.

8. A color television film-scanning system for scanning three primary color-separation motion picture films of like subject matter to develop a color video signal therefrom which comprises three intermittent film-feeding devices adapted to receive said color-separation films respectively, a scanning device and deflecting means associated therewith for developing a double-interlaced scanning pattern in which the interlace patterns alternate at field frequency, projection means for rendering said scanning device effective to scan films in said film-feeding devices, shutter means in the light paths between said film-feeding devices and said scanning device, said shutter means being synchronized with said field scansions to shift the scanning from one film-feeding device to another successively for successive field scansions in regularly recurring sequence, and an intermittent pull-down mechanism in each of said film-feeding devices and driving means therefor synchronized with said field scansions and designed and adapted to pull down the films in succession, the pull down of each film being timed to occur after each two field scansions thereof during the interval the other two films are being scanned.

References Cited in the file of this patent

UNITED STATES PATENTS

| | | |
|---|---|---|
| 2,275,898 | Goldsmith | Mar. 10, 1942 |
| 2,531,031 | France | Nov. 21, 1950 |
| 2,600,868 | Hales | June 17, 1952 |
| 2,607,845 | Clark | Aug. 19, 1952 |
| 2,627,547 | Bedford | Feb. 3, 1953 |